Patented Dec. 10, 1940

2,224,591

UNITED STATES PATENT OFFICE 2,224,591

ANTIGENIC SUBSTANCE

Milford John Boyd and Joseph T. Tamura, Cincinnati, Ohio

No Drawing. Application June 14, 1937, Serial No. 148,065

3 Claims. (Cl. 167—78)

This invention relates to a new series of antigens which are adapted for prophylactic and therapeutic purposes.

The object of the invention has been to provide antigenic substances which are immunologically potent, but essentially less toxic to the human system than the antigenic substances that have been available. The invention contemplates a series of antigenic substances free or substantially free from the toxic properties which usually cause local, focal or general reactions of an undesirable nature, when the antigens are administered to the system, and is directed also to a method for detoxifying substances intended for antigenic purposes without diminishing their prophylactic or their therapeutic potency.

We have discovered that the acetylation of antigens has a remarkable effect upon the toxic properties of these substances, but does not diminish their antigenic potency, or their power to confer immunity through stimulating the production of anti-bodies in the system. When the antigens are acetylated they are essentially detoxified, that is, they are free or substantially free from the poisonous properties which normally cause characteristic toxic reactions when antigens are administered by inoculation. The antigenic powers, however, remain undiminished.

By the term "acetylated antigens" we mean to denote antigenic substances such as vaccines, toxins, etc., to which one or more acetyl groups, $CH_3—CO$, have been introduced or incorporated.

According to the theory of the invention, acetylation, (or detoxification) is effected either by the substitution or addition of acetyl groups, but by reason of the fact that the chemical nature of the bacterial organisms and the related protein bodies is so complex, it is impossible to determine precisely the chemical changes which occur. The physical appearance of the detoxified substances is much the same as similar antigens which have not been detoxified.

From the clinical point of view, however, the detoxification which takes place permits inoculation by doses larger than those which heretofore have been given, without producing the usual toxic effects, the severity of which varies with the individual. For instance, 500 minimum lethal doses of acetylated diphtheria toxin to guinea pigs produced no toxic effects; 200 minimum lethal doses acetylated ricin to rats, or 100 to rabbits produced no toxic effects. Animals immunized with acetylated vaccine are highly resistant to doses of bacilli which are lethal for non-immunized animals.

To effect acetylation, we prefer to use ketene, $CH_2=CO$, primarily because ketene is relatively easy to prepare and convenient to use. Those skilled in the art readily will recognize that other methods for incorporating one or more acetyl groups into the antigen structure may be employed, as for instance, with acetic anhydride to kill bacteria.

While present scientific research does not explain fully the reaction of ketene with the bacterial microorganism or a related protein, the ketene reactions generally are addition reactions, and may be illustrated as follows:

$$CH_2=CO + H—NH—R \rightarrow CH_3CONH—R$$

The ketene is prepared preferably by the pyrolysis of acetone, though it may be made also by passing vapors of acetic anhydride over a platinum wire heated to redness, or through the action of zinc on a bromo-fatty acid bromide in indifferent solvents.

The following example for acetylation of antigens by means of ketene illustrates the method:

Ketene is produced by the thermal decomposition of acetone vapors. The gas is passed through a water condenser, and then through a spiral coil cooled to 0° C. to condense any acetone vapors and polymers of ketene (which polymerizes quite rapidly). After leaving the ice trap the ketene is passed through a small diameter tube into a vessel containing the bacterial suspension, antigen or protein. The antigen preferably is suspended in a saline solution or distilled water. With a tube of about 4 mm. in inside diameter, the ketene is run into the suspension at the rate of approximately 1 bubble per second for a period of time sufficient to effect acetylation. The suspension preferably is agitated during the treatment period and the pH may be kept nearly constant, for instance, by immersion of a sack containing the antigen in a vessel containing buffer solution.

The nature of the suspension depends largely upon the character of the antigen to be acetylated. As an illustration, a twenty-four hour culture of *B. dysenterae shiga* may be suspended in 10 cc. of saline solution and 190 cc. of 2 molar sodium acetate solution. Or, for example, a toxin such as ricin, derived from the castor bean, may be dissolved in distilled water, 10 mg. ricin to 50 cc. water, buffer such as bicarbonate of soda added and ketene passed through the solution to effect detoxification of the ricin in about three-quarters of an hour. Likewise the rate of addition of ketene, and the period of time during which ketene is introduced to effect acetylation, will vary in accordance with the nature of the antigen being acetylated. In determining when detoxification has taken place the same technique is employed as in determining the detoxification or toxicity of other vaccines.

Live bacterial organisms which are subjected to the action of ketene are killed quite rapidly, the period of time being from approximately a half to two hours or more, depending generally upon the nature of the organisms, their concentration, and the rate of ketene addition. For example, live organisms of *B. dysenterae shiga*, *Brucella abortus*, typhoid etc. are killed upon approximately one-half hour exposure of the bacterial suspension to ketene, while bacteria of the type of anthrax, or a non-pathogenic spore former such as *B. subtilis* may require exposure for a period of two hours or more before death occurs. After the acetylating period, the suspension is washed with sterile water and with sterile saline solution before the density of the suspension is adjusted to the desired degree.

Vaccines of the invention consist either of the organic substances, such as the toxins derived from bacterial bodies, or from bacterial microorganisms or proteins themselves. When the vaccines are used for animal inoculation the anti-serums derived from the animals are unusually high in anti-bodies indicating that acetylated antigens effect stimulation of the production of anti-bodies in the system into which the vaccines have been inoculated. The invention contemplates serums, or anti-serum derived from animals inoculated with ketenized vaccines. This aspect of the invention is an important one, first by reason of the fact that the ketenized vaccines are essentially non-toxic and larger doses can be inoculated into the animal without producing necrosis of the tissue at the site of injection, or generalized reaction in the animal. Secondly, anti-serum taken from animals so inoculated exhibits an agglutinin titer in many cases more than ten times greater than the agglutinin titer of anti-serum taken from animals inoculated with nitrous acid treated vaccines, heat killed vaccines, formalin treated vaccines, or those treated with sodium ricinolate. Agglutinin titers produced by acetylated vaccine ranged from 1:2560 to 1:10,240, whereas the other vaccine produced a titer from 1:320 to 1:2560. Normal healthy rabbits were used in these determinations.

The vaccines and serums of the present invention may be employed by physicians or clinicians in the conventional way except that concentrations and dosages are adjusted to take advantage of the novel properties of the acetylated antigens.

Having described our invention, we claim:

1. The method of detoxifying and killing a live toxic bacterial organism, which comprises, acetylating the organism.

2. The method of detoxifying and killing a live toxic bacterial organism, which comprises, acetylating the organisms by treating it with ketene.

3. An antigenic substance containing an acetylated toxic bacterial organism.

MILFORD JOHN BOYD.
JOSEPH T. TAMURA.